United States Patent [19]
Grippi et al.

[11] Patent Number: 4,986,005
[45] Date of Patent: Jan. 22, 1991

[54] PLEAT PATTERN LAYOUT ASSEMBLY AND METHOD

[76] Inventors: Christopher P. Grippi, 20 Galli Dr. #5, Novato, Calif. 94949; Vincent Grippi, 750 Liberty Rd., Petaluma, Calif. 94952

[21] Appl. No.: 390,203

[22] Filed: Aug. 7, 1989

[51] Int. Cl.[5] ........................ G01B 3/14; B05C 17/06

[52] U.S. Cl. ........................................ 33/563; 33/13; 33/1 B; 101/127; 434/87

[58] Field of Search ................. 33/11, 12, 13, 5, 17 R, 33/562, 563, 566, 1 B, 2 R, 414; 101/114, 127; 401/126-130, 139; 434/417, 87; 223/28, 34, 35

[56] References Cited

U.S. PATENT DOCUMENTS

| | | | |
|---|---|---|---|
| 732,863 | 7/1903 | Jones | 434/417 |
| 2,090,186 | 8/1937 | Corbett | 434/87 X |
| 2,095,943 | 10/1937 | Zachs | 33/1 B |
| 2,763,937 | 9/1956 | Urbain | 434/417 |
| 3,369,303 | 2/1968 | Henry | 33/563 |
| 3,855,924 | 12/1974 | Morse | 33/563 X |

FOREIGN PATENT DOCUMENTS

| | | | |
|---|---|---|---|
| 23345 | of 1902 | United Kingdom | 101/127 |

*Primary Examiner*—Harry N. Haroian
*Attorney, Agent, or Firm*—Flehr, Hohbach, Test, Albritton & Herbert

[57] ABSTRACT

An upholstery pleat layout device having a pounce template with a plurality of parallel rows of apertures and a pounce applicator assembly. The pounce template preferably further includes indexing indicia positioned in indexed relation to the rows of apertures to enable the template to be moved between a plurality of index positions for the formation of pleat layout patterns by a combination of pounce markings. The applicator assembly includes a felt applicator, a piece of chalk and a chalk holder supporting the chalk in a position for rubbing of the felt applicator across the surface of the chalk to transfer chalk pounce to the applicator for subsequent transfer of pounce from the applicator through the pounce template.

13 Claims, 2 Drawing Sheets

PLEAT PATTERN LAYOUT ASSEMBLY AND METHOD

TECHNICAL FIELD

The present invention relates, in general, to apparatus such as pounce patterns for laying out markings on fabrics and various kinds of sheet material, and more particularly, relates to methods and apparatus for laying out pleat patterns on upholstery, such as automobile upholstery.

BACKGROUND ART

The use of various pleat designs in upholstery for automobiles, boats, motor homes and even conventional furniture is widespread. The most conventional pleat design is simply parallel rows of pleats which extend, usually longitudinally, along the upholstery material. It is not uncommon, however, for other upholstery patterns to be formed, such as diamond patterns, and customized upholstery shops are often faced with a substantial task in laying out patterns for the formation of pleats in upholstery.

The technique which is most commonly used in connection with the layout of pleat patterns for automobile upholstery is simply to layout the material to be pleated on a flat surface and then, using a layout square or graduated straight edge ruler, bottom and edges of the material are marked with the desired markings that indicate where the pleats or diamonds are to be laid out. The upholsterer then uses the edge of the layout square or ruler to chalk the pleat lines between the markings laid down on the material. Finally, the upholsterer can sew along the pleat lines.

This pleat pattern layout process is time consuming, even for straight rows of pleats. It is particularly time consuming for patterns such as diamond patterns, which require markings along the sides, as well as the top and bottom of the sheet of material to be pleated. Moreover, laying out the pattern on the material using conventional techniques often results in a waste of time in planning the layout, or a waste of material for failing to properly plan the layout.

Although not used in the upholstery industry in connection with the formation of pleats, pounce patterns have been employed extensively in the garment industry for many years. A typical pounce pattern is formed as a sheet of paper or card stock having a plurality of side-by-side holes which define the periphery of a piece of a garment to be cut from a sheet of garment stock. Pounce, a finely divided particulate material such as chalk or carbon black, normally is dispensed from a pounce bag formed of a porous fabric, and the pounce bag is tapped against the pounce pattern to cause pounce to pass through the openings in the pattern and onto the garment fabric.

In the garment industry multiple sheets of fabric stock usually are stacked and several pounce patterns are arranged on the uppermost sheet in a manner minimizing the waste between the pattern precess. The pounce pattern is held in place and then pounce applied to stencil the pattern on the uppermost sheet, whereupon the plurality of sheets are simultaneously cut along the pounce patterns to produce a plurality of garment pieces having exactly the same shape.

Since pounce patterns have heretofore been used primarily to layout the periphery of fabric pattern pieces, and since the peripheral shape of most upholstered pieces is often a simple configuration, for example, a rectangle, pounce patterns have seldom, if ever, been used to effect cutting of pieces of upholstery to be pleated. Moreover, pounce patterns conventionally have been used in the garment industry by holding the pattern in a single position while the pounce markings are stencilled onto the sheet to be cut; pounce patterns generally are not moved during the layout of a pattern.

Moreover, in the garment industry, the layout of patterns on fabric stock does not require the use of layout squares or rulers. Upholsterers, however, must employ such tools, and any device which enhances pleat pattern layout should not accomplish that end at the expense of multiplication of the number of tools which the upholsterer must manipulate.

Accordingly, it is an object of the present invention to provide an apparatus and method for the layout of pleat lines on a sheet of material to be pleated, such as upholstery.

A further object of the present invention is to provide a pounce template and a pounce applicator assembly which are particularly well suited for the layout of pleat lines on upholstery material.

Another object of the present invention is to provide a pounce pattern template which also can be used as a pattern layout square.

Still another object of the present invention is to provide a method for laying out pleat lines on upholstery material which is easy for relatively unskilled workers to layout a variety of different pleat patterns.

Still another object of the present invention is to provide a method and apparatus for laying out a pattern for pleats, or the like, on sheet material which is easy to use, has a minimum number of components, minimizes waste, and is inexpensive to construct.

Another object of the present invention is to provide a pounce applicator assembly which is particularly suitable for the application of pounce material to upholstery in the laying out of pleat lines.

Still a further object of the present invention is to provide a pounce applicator assembly which employs conventional materials in an easy to use structure for controlled application of pounce to the pounce template.

Still another object of the present invention is to provide a pounce template which can be positioned in a plurality of different indexed orientations on the sheet of material to be pleated so as to build complex pleat patterns from a combination of pounce markings.

The present invention has other objects and features which will become apparent from and are set forth in more detail in the accompanying drawing and following description of the Best Mode of Carrying Out the Invention.

DISCLOSURE OF THE INVENTION

The apparatus for marking a layout pattern for pleats on a piece of material to be pleated of the present invention is comprised, briefly, of a pounce template with a plurality of apertures therein and indexing indicia thereon; and a pounce applicator assembly including a felt applicator and chalk holder. The pounce template indexing indicia allow the template to be positioned in a first orientation for the application of pounce to the sheet of material through the apertures, and then repositioning of the template in a second orientation index to the first orientation by the indexing means for the application of pounce a second time through the apertures. The combination of pounce applications results in the layout of a pattern for pleats which can include parallel rows, half-width rows, diamond patterns, squares, and triangles.

The method of the present invention is comprised, briefly, of the steps of placing a pounce template on top of the workpiece to be pleated in a first orientation, applying pounce through the pattern, using indexing means on the pounce pattern to orient the pattern in a second index relation to the first orientation, and applying pounce again to the workpiece through apertures in the pounce template.

BEST MODE OF CARRYING OUT THE INVENTION

Figure 1:
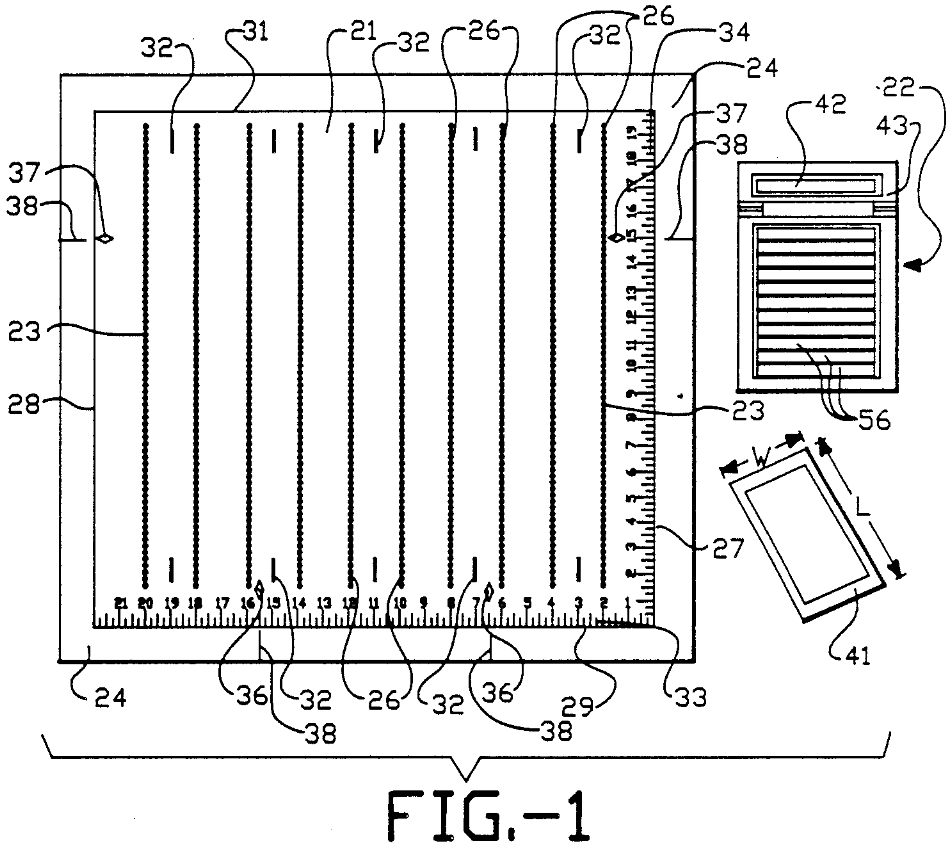
FIG. 1 is a top plan view of a pleat layout apparatus constructed in accordance with the present invention and shown with a pounce template positioned on material to be pleated.

The pleat layout apparatus of the present invention includes three basic components, namely, a pounce template, generally designated 21, and a pounce applicator assembly including chalk holder 22 and felt applicator 41. Pounce template 21 preferably is formed as a transparent sheet-like member and includes a plurality of apertures 23 which extend through the sheet to allow pounce to pass through the template and onto the sheet of material 24 to be pleated.

The improvement in the layout device of the present invention is comprised of pounce template 21 having apertures 23 which are positioned in the template in a plurality of rows 26. Preferably, rows 26 are in side-by-side substantially parallel relation and are equally spaced from each other. Most preferably, pounce template 21 is a rectangular sheet-like member and rows 26 are parallel to side edges 27 and 28 of the sheet and spaced from edges 27 and 28 of sheet 21 by an amount equal to the spacing between rows. Additionally, pounce template 21 preferably has a bottom edge 29 which is perpendicularly oriented to side edges 27 and 28 and a parallel opposite top edge 31.

As thus far described, pounce template 21 is capable of transferring or stenciling pounce in rows on the upholstery material 24. This structure alone greatly facilitates the layout of standard longitudinally extending pleats. In the most preferred form, rows 26 of apertures 23 are spaced by 2 inches, which is the standard pleat spacing in the automobile upholstery industry. Thus, one can transfer a pattern of longitudinal rows of pleats onto material 24 simply by using applicator means to apply pounce material through apertures 23 and onto material 24.

In the preferred form of a pounce template of the present invention, however, template 21 also carries indexing means positioned in indexed relation relative to rows 26 of apertures 23 so as to enable template 21 to be moved over workpiece 24 between a plurality of relatively indexed positions to permit the formation of a pleat layout pattern by a combination of pounce markings at the various moved positions. In template 21 of FIG. 1, two types of indexing means are shown. The first is half-width indicia 32 positioned intermediate rows 26 at about the midpoint between the rows. Indexing indicia 32 preferably are provided proximate opposite edges of template 21, in this case, the top edge 31 and bottom edge 29 of template 21.

In order to form half-width spaced pleats, template 21 is positioned as shown in FIG. 1 and the pounce applicator assembly is used to lay down pounce markings along rows 26 with template 21 held in a first position or orientation with respect to upholstery sheet 24. Template 21 is then moved until half-width indicia 32 are positioned over the pounce markings laid down on material 23. This in turn positions apertures 23 in parallel relation at one-half the distance between the first set of pounce markings on sheet 24. At this point, a second application of pounce to template 21 by the pounce applicator means will lay down a second set of pounce markings that are located equidistance between and parallel to the first set of pounce markings transferred to upholstery sheet 24. Template 21 is then lifted from sheet 24 to reveal parallel rows of pounce markings forming lines which are spaced from each other by 1 inch.

As will be apparent, the same template 21 can also be used to layout squares or rectangles by rotating the template by 90 degrees and then laying down pounce markings in the rotated position. If one wants, for example, to layout rectangles, instead of squares, pounce markings can simply be erased by rubbing the pounce off upholstery material 24 along selected rows. Thus, half-width indicia 32 in combination with parallel rows 26 of apertures 23 allow template 21 to be used for the laying out of a great number of possible row, square and rectangular pleat patterns.

In order to further enhance the positioning of the pleat patterns on material 24, template 21 preferably includes ruler means along one, and most preferably two perpendicular edges of the template. As will be seen, therefore, bottom edge 29 in FIG. 1 preferably includes ruler means 33 while side edge 27 includes ruler means 34. The ruler means are formed by precisely spaced markings or indicia along the edge of template 21 so that chalk can be used to mark at various intervals along template 21, as desired. Moreover, since edges 27 and 29 are perpendicular to each other, template 21 also acts as a layout square for the marking of perpendicular edges on material 24. Thus, the number of tools required to be manipulated by the upholsterer is minimized by combining the ruler and layout square with pounce pattern template 21.

The upholstery pounce template 21 of the present invention preferably also includes diamond pattern indexing indicia. Such indexing indicia can be provided by four indicia positioned at proximate edges of template 21. Thus, a first pair of diamond indicia 36 can be seen in FIG. 1 along bottom edge 29 of template 21. Indicia 36 are positioned along bottom edge 29 at equal distances from side edges 27 and 28. As shown in the drawing, diamond indicia 36 are located inwardly from the side edges by a distance of about 6¼ inches. A second pair of diamond indicia 37 also are provided on template 21. The second pair of diamond indicia 37 are positioned with one of the indicia on edge 27 and the opposite indicia on edge 28. The two indicia 37 are positioned at the same distance from the lower edge (or upper edge) of the template.

Use of the diamond pattern indicia 36 and 37 can best be understood by reference to the sequence of FIGS. 1, 3, 4 and 5. First, the template is laid on material 24 as shown in FIG. 1. The upholsterer can chalk a line along edges 27, 29 and 28 or simply make a chalk line along the edges 27, 29 and 28 in the area of diamond indicia 36 and 37. Four perpendicular marks 38 are then made to the chalk lines along the edges of template 21 at the diamond pattern indicia 36 and 37. The template is then picked up and moved to the position shown in FIG. 3. One of rows 26 is then aligned between markings 38 to index template 21 with respect to upholstery sheet 24. Applicator means is then used to apply pounce through apertures 23 at a diagonal orientation with respect to sheet 24. Template 21 is then moved to the position shown in FIG. 4 in which one of rows 26 is now aligned between diamond indicia markings 38 on the opposite side and bottom of the pattern. The applicator means applies pounce to sheet 24 through apertures 23 while template 21 is held in the position of FIG. 4.

Figure 5:
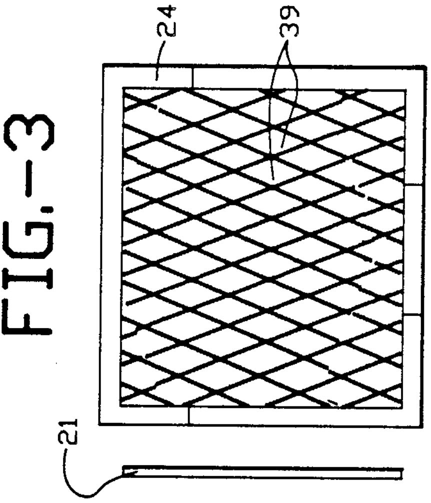
FIG. 5 is a top plan view of the diamond pattern resulting from using the apparatus of the present invention.

When the template is lifted from sheet 24 a diamond pattern, shown in FIG. 5, of pounce markings 39 has been laid out on upholstery material 24.

As will be appreciated, the layout of a diamond pounce pattern as shown in FIG. 5 using conventional pleat layout measuring techniques, would be very time consuming and tedious. Using the template of the present invention, however, the pattern can be quickly transferred to the upholstery material. It should also be noted, that half-width indicia 32 can be used to lay out diamond patterns which are one-quarter the size or even two layout patterns which are parallelograms. Moreover, the diamond pattern indicia can be used in combination with rotation of the template to lay out triangular patterns. Thus, one can first lay out a diamond pattern and then rotate the template by 90 degrees and apply pounce along a line which joins the inner sections of the diamonds. The template can then be moved slightly to align the next row of intersections, and so forth.

Thus, pounce template 21 of the present invention affords the upholsterer a simple tool for rapidly laying out a variety of commonly employed pleat patterns. The template also acts as a layout square so as to square-up the edges of the material with respect to the pattern which is marked using the template. Finally, the template can be used as a measuring tool when required during the layout process.

It is also an important aspect of the present invention to provide a pounce applicator assembly which is particularly well-suited for use with template 21. In the preferred form, pounce applicator assembly includes felt applicator, such as a conventional chalkboard eraser 41, at least one piece of chalk 42 and chalk holder means, generally designated 22. Chalk holder means 22 supports chalk 42 in a position for rubbing of felt applicator 41 across a surface of chalk 42 to transfer chalk pounce to the applicator for subsequent transfer of the chalk pounce from the applicator through template 21 to workpiece 24. Most preferably, chalk piece 42 is a conventional elongated substantially cylindrical piece of chalk, and holder means 22 takes the form of a rectangular trough-like structure 43 that supports the chalk in a horizontal orientation so that felt applicator or felt eraser 41 can engage an arcuate side surface of the chalk.

In order to support chalk 42 for rubbing of felt applicator 41 thereover, it is preferable that one end of chalk holder 43 be formed with a chalk holding recess having a sloping bottom surface 46 which terminates in shoulder means 47. Thus, bottom surface 46 tends to urge chalk piece 42 against shoulder means 47, and applicator 41 can be pulled in the direction of arrow 48 to rub chalk off of arcuate surface 49 of chalk piece 42. This transfers chalk from the solid stick in the form of finely divided particles, or pounce, onto the bottom surface 51 of felt applicator 41. The felt applicator may then simply be rubbed across the top of template 21, and chalk on surface 51 will be caught by the edges of apertures 23 and fall down onto upholstery material 24.

Figure 2:
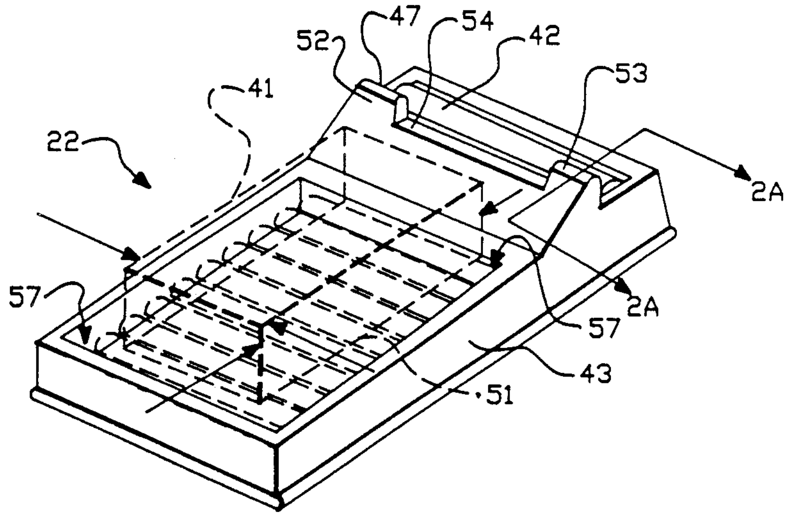
FIG. 2 is a top perspective view of a chalk holder assembly and felt applicator (shown in phantom) constructed in accordance with the present invention.
Figure 4:
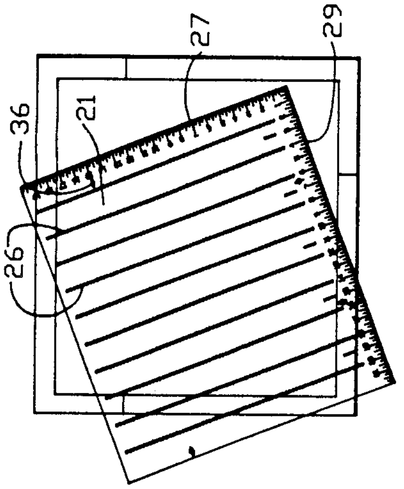
FIG. 4 is a top plan view corresponding to FIG. 3 of the pounce template of the present invention in a second orientation for layout of a diamond pattern.
Figure 2A:
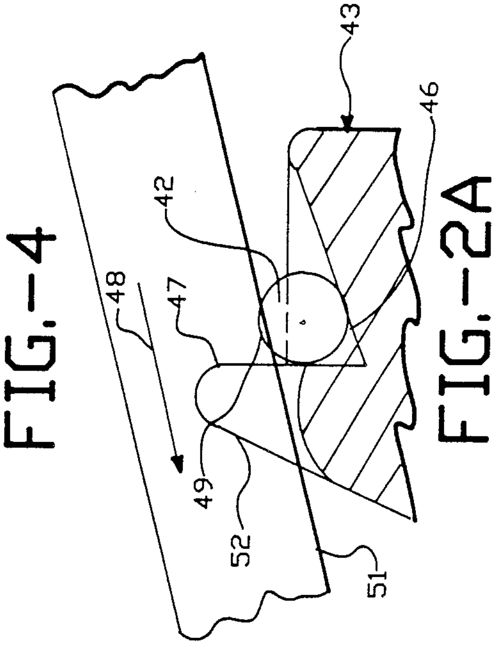
FIG. 2A is an enlarged, fragmentary, cross-sectional view taken substantially in the area of line 2A—2A in FIG. 2.

As best may be seen in FIG. 2, shoulder means 47 includes a pair of shoulder portions 52 and 53 which define a notch 54 dimensioned to receive the width dimension W of applicator 41. Thus, notch 54 allows the user to draw felt applicator 41 down over the chalk between the two shoulder portions 52 and 53.

In order to provide enhanced convenience, holder 43 preferably is formed for free-standing support on a level support surface and has sufficient weight and frictional resistance relative to the support surface to permit felt applicator 41 to be drawn over the chalk without the need for the user to grip the chalk holder.

Additionally, it is advantageous for chalk holder 43 to include a recess 57 dimensioned to receive a plurality of pieces of chalk 56 in a horizontal orientation, as shown in FIGS. 1 and 2. Recess 57 also preferably has a length equal to the length dimension L of applicator 41 and a depth which is greater than the diameter of pieces of chalk 56 so that the felt applicator 41 may be stored on top of the stored chalk 56. Thus, the pounce transferring lower surface 51 of applicator 41 normally will be in contact with chalk 56 stored in the chalk holder when the applicator is not in use. This keeps chalk pounce from inadvertently contacting various objects, and tends to apply pounce to surface 51 to a limited degree.

Both the recess for chalk piece 42 and the recess 57 in chalk holder 43 are preferably formed for easy insertion and removal of chalk pieces therein. This allows the upholsterer, for example, to just lift chalk piece 42 from trough 43 and use it to mark on the sheet of material to be upholstered, for example, by marking diamond pattern indexing marks 38. The same piece of chalk can then be placed in the trough holder and used to provide pounce for the felt applicator used to apply pounce.

In the preferred form, the pounce template is formed of a thin sheet of transparent plastic material. This facilitates, for example, alignment of the rows 26 of apertures with markings made on the upholstery material. Thus, being able to see through the template allows virtually any row 26 of apertures 23 to be aligned between markings 38 to form the diamond pleat patterns. An upholstery kit typically would include three such templates having row spacings of 1½, 2, and 2½ inches, as well as a chalk holder, chalk and a felt applicator.

Figure 3:
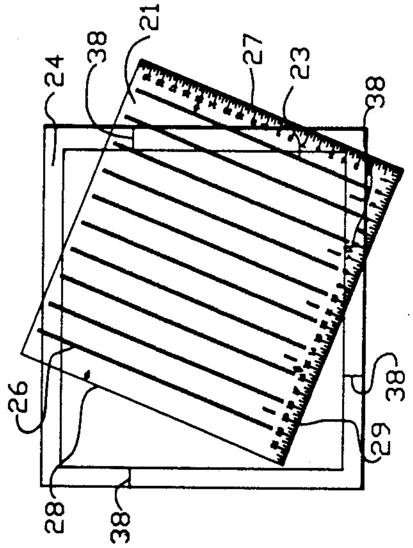
FIG. 3 is a top plan view of the pounce template of the present invention shown during layout of a diamond pleat pattern.

The method of marking a layout pattern for pleats on a workpiece of the present invention includes the steps of placing a pounce template 21 on top of a workpiece to be pleated 24 in a first orientation, for example as shown in FIG. 3. Template 21 has a plurality of rows 26 of apertures 23 formed therethrough and indexing means carried thereby. The next step in the method is comprised of applying a pounce material to the workpiece through apertures 23 by a pounce applicator means while pounce template 21 is in the first orientation. The method further includes the step of using index means on the template to place the template on top of the workpiece in a second orientation, which is indexed relative to the first orientation.

When a diamond pattern is laid out, indexing means 36 and 37 are used to apply indexing markings 38 on the workpiece prior to the step of placing pounce template 21 on top of the workpiece. When half-width patterns are being laid out, indexing indicia 32 are used to place the template in a second orientation by merely shifting the template until the indexing indicia on the template 21 align with the pounce markings laid down when the template was in the first orientation.

Finally, the method of the present invention includes the step of applying pounce material to a workpiece through the apertures while the pounce template is in the second orientation to produce a layout pattern comprised of a combination of pounce markings from the first orientation and the second orientation, as shown in FIG. 5.

Moreover, the method of the present invention most preferably includes applying the pounce material by rubbing a felt applicator carrying chalk pounce across a sheet-like template having apertures therein to apply chalk pounce through the apertures to the workpiece.

What is claimed is:

1. In a pounce template for stenciling a pleat layout pattern of pounce markings on a sheet of material to be pleated, said template having a plurality of apertures therein for the application of pounce therethrough to said workpiece and two edges oriented perpendicularly to each other, the improvement in said pounce template comprising:

said template being transparent and including ruler means proximate at least one of said two edges;

said apertures being positioned in said template in a plurality of rows, said rows being substantially parallel to each other and oriented in a known angular position relative to at least one of said two edges; and said pounce template carrying indexing means thereon provided by indicia proximate said two edges positioned in indexed relation relative to said rows of said apertures to enable said template to be moved over said workpiece between a plurality of relatively indexed positions to permit formation of said layout pattern by a combination of pounce markings at said plurality of relatively indexed positions.

2. The pounce template as defined in claim 1 wherein, said template is a plastic member and includes ruler means extending along mutually perpendicular edges of said rectangular sheet-like member.

3. The pounce template as defined in claim 2 wherein, said indicia includes indicia between adjacent parallel rows of apertures to permit transfer of pounce markings to said workpiece in rows positioned intermediate the spacing of rows on said template.

4. The pounce template as defined in claim 3 wherein, said template is a rectangular sheet of transparent plastic member;

said indicia include four indicia on said plastic member with two indicia positioned along one edge of said plastic member at equal distances from opposite perpendicular edges of said plastic member, and with the remaining two indicia positioned with one indicia proximate each of said opposite perpendicular edges at substantially the same distance from said one edge.

5. In a pounce applicator assembly including a felt applicator, a piece of substantially cylindrical chalk, and chalk holder means including a recess with shoulder means along one side thereof supporting said chalk in a position for rubbing of said applicator across an arcuate side surface of said chalk in a direction toward said shoulder means to transfer chalk pounce to said applicator for subsequent transfer of chalk pounce from said applicator through a template to a workpiece, wherein the improvement in said assembly comprises:

said recess being formed with a bottom surface which slopes from an edge of said recess toward said shoulder means; and said shoulder means has spaced apart shoulder portions defining a notch therebetween dimensioned to receive a width dimension of said applicator to permit said applicator to be pulled along the length of said applicator over said piece of chalk in said recess.

6. The pounce applicator assembly as defined in claim 5 wherein, said holder means receives and stores a plurality of pieces of cylindrical chalk and supports said applicator when not in use.

7. The pounce applicator as defined in claim 6 wherein, said holder means is formed with an upwardly facing recess dimensioned to receive and store said plurality of pieces of cylindrical chalk on their sides, said upwardly facing recess is dimensioned for support of said applicator on top of and in contact with said sides of said plurality of pieces of chalk.

8. A method of marking a layout pattern for pleats on a workpiece to be pleated comprising the steps of:

(a) placing a pounce template on top of said workpiece to be pleated in a first orientation, said template having a plurality of rows of apertures formed therethrough and having indexing means carried thereby;

(b) while said pounce template is in said first orientation, applying a pounce material to said workpiece through said apertures by pounce applicator means;

(c) using said indexing means to place said pounce template on top of said workpiece in a second orientation which is indexed relative to said first orientation: and (d) while said pounce template is in said second orientation, applying a pounce material to said workpiece through said apertures by said pounce applicator means to produce a layout pattern comprised of a combination of pounce markings from said first orientation and said second orientation.

9. The method as defined in claim 8 wherein, said steps of applying a pounce material are accomplished by rubbing a felt applicator across chalk to transfer chalk pounce to said applicator, and thereafter rubbing said applicator across said template to apply chalk pounce to said workpiece.

10. The method as defined in claim 8 wherein, said step of using said indexing means is accomplished by aligning said pounce template in a second orientation producing rows of pounce markings between the rows of pounce markings produced during the step of applying pounce material while said template is in said first orientation.

11. The method as defined in claim 8 wherein, said step of using said indexing means is accomplished by aligning said pounce template in a second orientation producing with said first orientation a diamond-shaped layout pattern of pounce markings on said workpiece.

12. In a pounce template for stenciling a pleat layout pattern of pounce markings on a sheet of material to be pleated, said template being a sheet-like member having a plurality of apertures positioned in a plurality of substantially parallel rows for the application of pounce therethrough to said workpiece, the improvement in said pounce template comprising;

said pounce template carrying indicia thereon positioned in indexed relation relative to said rows of said apertures, including indicia between adjacent parallel rows of apertures, to enable said template to be moved over said workpiece between a plurality of relatively indexed positions to permit formation of said layout pattern by a combination of pounce markings at said plurality of relatively indexed positions, including pounce markings in rows positioned intermediate the spacing of rows on said template.

13. In a pounce template for stenciling a pleat layout pattern of pounce markings on a sheet of material to be pleated, said template having a plurality of apertures positioned in a plurality of rows for the application of pounce therethrough to said workpiece, and carrying indexing means thereon positioned in indexed relation relative to said rows of said apertures to enable said template to be moved over said workpiece between a plurality of relatively indexed positions to permit formation of said layout pattern by a combination of pounce markings at said plurality of relatively indexed positions, the improvement in said pounce template comprising:

said indexing means being positioned on said template to enable the formation of an indexed diamond-shaped layout pattern of pounce markings;

said template being a rectangular sheet of transparent plastic member; and said indicia including four indicia on said plastic member with two indicia positioned along one edge of said plastic member at equal distances from opposite perpendicular edges of said plastic member, and with the remaining two indicia positioned with one indicia proximate each of said opposite perpendicular edges at substantially the same distance from said one edge.

* * * * *

UNITED STATES PATENT AND TRADEMARK OFFICE
CERTIFICATE OF CORRECTION

PATENT NO. : 4,986,005

DATED : January 22, 1991

INVENTOR(S) : Christopher P. Grippi, et al.

It is certified that error appears in the above-identified patent and that said Letters Patent is hereby corrected as shown below:

Column 5, line 3, delete "6 1/4" and insert ---6 1/2---.

Signed and Sealed this

Thirtieth Day of June, 1992

*Attest:*

DOUGLAS B. COMER

*Attesting Officer*

*Acting Commissioner of Patents and Trademarks*